(12) United States Patent
Bromer

(10) Patent No.: US 7,232,067 B1
(45) Date of Patent: Jun. 19, 2007

(54) REGISTERING MULTIPLE SIMILAR ITEMS WITH FLICKERS

(76) Inventor: Nicholas Sheppard Bromer, 402 Stackstown Rd., Marietta, PA (US) 17547-9311

( * ) Notice: Subject to any disclaimer, the term of this patent is extended or adjusted under 35 U.S.C. 154(b) by 49 days.

(21) Appl. No.: 11/143,689

(22) Filed: Jun. 2, 2005

Related U.S. Application Data

(60) Continuation-in-part of application No. 10/287,394, filed on Nov. 4, 2002, now Pat. No. 7,061,395, which is a division of application No. 09/987,241, filed on Nov. 14, 2001, now Pat. No. 6,476,715.

(60) Provisional application No. 60/577,941, filed on Jun. 8, 2004, provisional application No. 60/290,687, filed on May 15, 2001.

(51) Int. Cl.
*G06Q 90/00* (2006.01)
(52) U.S. Cl. .................. 235/385; 235/454; 235/491; 705/22; 705/28
(58) Field of Classification Search ................ 235/385, 235/451, 454, 491; 705/22, 28
See application file for complete search history.

(56) References Cited

U.S. PATENT DOCUMENTS

| | | | |
|---|---|---|---|
| 5,172,113 A | 12/1992 | Hamer | |
| 5,181,062 A | 1/1993 | Kazumi | |
| 5,214,268 A | 5/1993 | Doing | |
| 5,321,245 A | 6/1994 | Kazumi | |
| 5,343,267 A | 8/1994 | Kazumi | |
| 5,380,994 A | 1/1995 | Ray | |
| 5,381,207 A | 1/1995 | Kazumi | |
| 5,422,473 A | 6/1995 | Kamata | |
| 5,568,406 A | 10/1996 | Gerber | |
| 5,760,383 A | 6/1998 | Heske, III | |
| 5,802,015 A * | 9/1998 | Rothschild et al. | ........... 368/10 |
| 5,870,215 A | 2/1999 | Milano | |
| 6,058,374 A * | 5/2000 | Guthrie et al. | ................ 705/28 |
| 6,087,932 A | 7/2000 | Belgard | |
| 6,089,453 A | 7/2000 | Kayser | |
| 6,152,588 A | 11/2000 | Scifres | |
| RE37,290 E | 7/2001 | David | |
| 6,298,331 B1 * | 10/2001 | Walker et al. | ................ 705/15 |
| 6,693,539 B2 * | 2/2004 | Bowers et al. | ........... 340/572.1 |
| 6,927,692 B1 * | 8/2005 | Petrinovic | ................ 340/572.1 |

* cited by examiner

*Primary Examiner*—Michael G. Lee
*Assistant Examiner*—Kristy A. Haupt

(57) ABSTRACT

Items, for example grocery items in a shopping cart or warehoused items being inventoried, are counted by electronically registering flickers from tags attached to, or incorporated into, the items. The registration takes place during an interval of time equal to the flicker repetition rate of the tags. For example, each item's tag might flicker out an identifying signal (preferably from an LED in the tag) in about a thousandth of a second, and repeat this flicker once a second. A detector registers all of the flickers from all of the items during a one-second interval, and thereby counts the items because each will have flickered once during that time. Other items, with different identifying flickers, can be counted during the same interval. Thus, large numbers of various tagged items can be counted rapidly.

20 Claims, 1 Drawing Sheet

FIG. 1
FIG. 1 A
FIG. 1 B
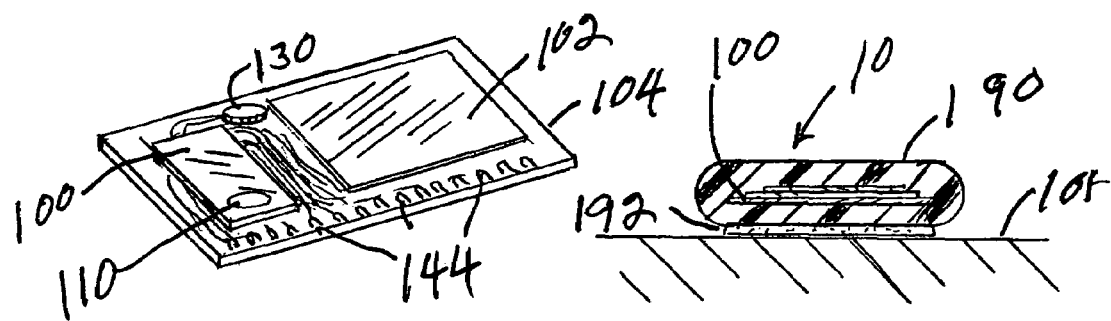
FIG. 2
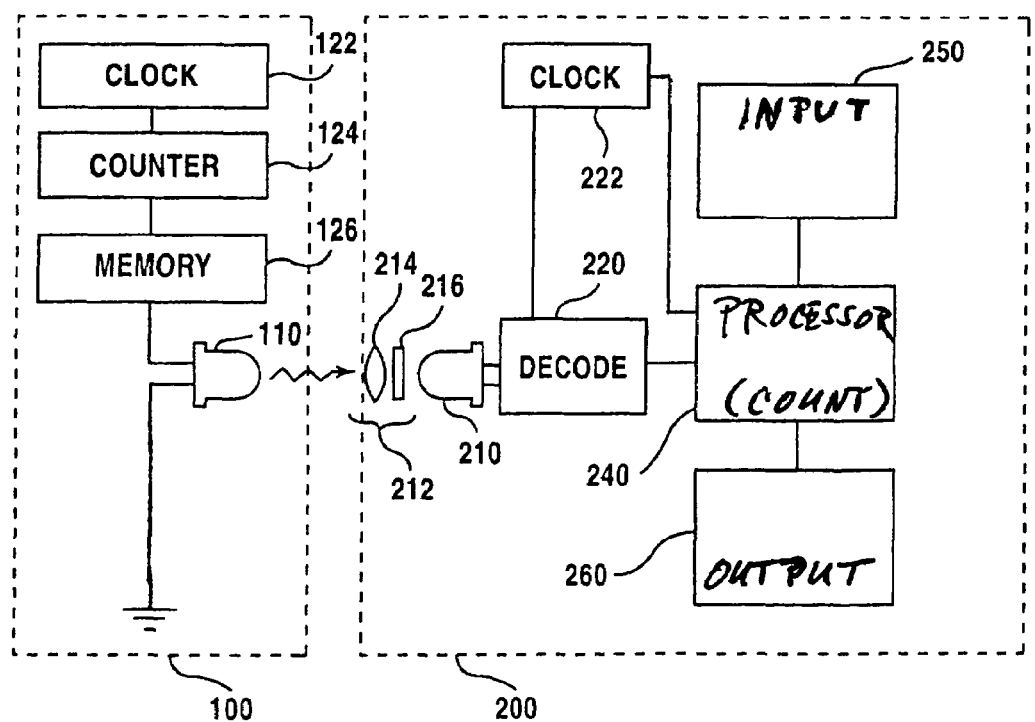

REGISTERING MULTIPLE SIMILAR ITEMS WITH FLICKERS

CROSS REFERENCE TO RELATED APPLICATIONS

This application claims benefit of provisional application 60/577,941, filed on Jun. 8, 2004 by the same applicant, the entire disclosure of which is entirely incorporated herein by reference. This application is a continuation-in-part of application Ser. No. 10/287,394, filed on Nov. 4, 2002 now U.S. Pat. No. 7,061,395 by the same Applicant and entitled LOCATING ITEMS WITH FLICKERING LAMPS, the entire disclosure of which is entirely incorporated herein by reference. Application Ser. No. 10/287,394 was a division of application Ser. No. 09/987,241, filed by the same Applicant on Nov. 14, 2001 and entitled LAND VEHICLE IDENTIFICATION BY FLICKERING LAMPS (application Ser. No. 09/987,241 is now U.S. Pat. No. 6,476,715). The entire contents of application Ser. No. 09/987,241 were entirely incorporated into application Ser. No. 10/287,394 by reference, including those portions of application Ser. No. 09/987,241 that were incorporated therein by reference and do not appear in the text of U.S. Pat. No. 6,476,715. (U.S. Pat. No. 6,476,715 was entirely incorporated by reference into provisional application 60/577,941.) The Applicant's application Ser. No. 09/987,341 claimed benefit of the filing date of Application 60/290,687, filed May 15, 2001 and also incorporated the whole disclosure of that provisional application 60/290,687 by reference. Therefore this continuation application incorporates the subject matter of application 60/290,687 as well as the intervening applications.

My new embodiment to be described below uses flickering lamps in tags attached to respective items in a collection of items. The flickers, which identify each item, preferably repeat at a fixed interval so that, during any time period extending for that interval, each item in the collection will flicker exactly once.

Because of this, a detector that registers the flickers will be able to detect each item during the fixed interval of repetition, which I will refer to as a "repetition interval."

Application 60/290,687 was filed on May 15, 2001. That provisional application was directed mostly to putting a flickering lamp next to a supply of similar items, not on the items themselves, but stated that "the flickering lamp may be attached to each item" (page 11, ¶ 2). Claim 12 of application 60/290,687 recites "an item belonging to a subset of a plurality of items . . . a flickering lamp, associated with the item." The same application at the top of page 5 states, "The lamp may be caused to . . . flicker by a stimulus, or to emit the temporal bar code pattern continuously or continually." The word "continually" means "at regular or frequent intervals" (Random House Dictionary), and "regular intervals" implies a definite and fixed repetition rate. A repetition rate of definite value is also discussed (for vehicles) at page 10, ¶ 2. That same provisional application also defined "bar code" broadly (at page 11, ¶ 4) to include any bar-code type of encoding which uses two states (i.e., digital encoding) and is sequential, so that "bar code" does not cover just standard or particular bar codes like UPC.

Thus, a steady repetition rate of flickering in lamps associated with and/or attached to individual items was disclosed in the May 15, 2001 provisional application 60/290,687.

BACKGROUND

In an article in Scientific American magazine (vol. 290, no. 1, January 2004, incorporated by reference), Roy Want discusses RFID (radio-frequency identification) technology, which is widely used in retail theft prevention and vehicle registration at toll booths. Want states (page 58, bottom of third column), "higher-frequency [RFID] tags now enable a reader [detector] to identify many individual tags grouped together, even haphazardly—although they are not yet able to distinguish perfectly among all the items in a loaded grocery cart [which] is a major aim of this technology. Once perfected, such RFID scanning should steamline inventory and checkout procedures and save millions of dollars for retailers." Want cites (page 65) The RFID Handbook by Klaus Finkenzeller, published by John Wiley & Sons, which is entirely incorporated herein by reference.

The probable reason that RFID cannot distinguish items jumbled haphazardly is that RFID tags are powered by radio signals from the RFID detector, which means that after they are exposed to the radio energy from the detector, they will respond after a certain interval. (The radio-wave energy they receive is accumulated in a capacitor until there is enough charge to run the tag-signal emitting circuit.) Therefore, if there are two cans of Grandma's Chicken Soup, 16 oz. size, in the grocery cart, the tags on both cans will respond at about the same time, if they are next to each other and similarly oriented. If they are not oriented the same, or are at different distances from the detector, or are more or less obscured by a radio-blocking object (such as a metallic food package), then they will respond at different times.

In any event, there will be no information available from the timing of the identifying signals from the two tags of the two cans.

Also, conventional tags do not have a definite repetition rate at which they send out identification information, so if the tags' information is sent out repeatedly in identifiable bursts, then the repetition interval of any such bursts is not constant or steady.

It appears that, because there is little information available from the timing of the signals from the RFID tags, there is little possibility of using that timing to count the number of one item (e.g., Grandma's Chicken Soup, 16 oz. size) in the cart.

SUMMARY OF THE INVENTION

Picture a grocery cart, full of grocery items, which has been brought near to a detector. Each of the items includes a small solid-state lamp, such as an LED, emitting flickers which identify that item. The flickering mechanism is discussed below. (Radio signals from transmitters can also be used.)

The detector may include various light sensors arrayed around the grocery cart to detect flickers from items jumbled inside other items. Such plural sensors can be ganged and their signals combined to increase the effective detector sensitivity.

The flickers embody the identity of each item in the cart, and may also identify the individual identity of the items in the cart. For example, there may be two or more cans of Grandma's Chicken Soup, 16 oz. size, in the cart. The flickers might identify each can not only as Grandma's Chicken Soup, 16 oz size, but also as a can from a batch manufactured on a certain date, or even as one particular can with its own individual number or alphanumeric. Thus, the flickers from the various cans of Grandma's Chicken Soup, 16 oz. size, might be distinguishable from each other, but also might not, depending on what information is included.

In the case where the flickers only identify each can as Grandma's Chicken Soup, 16 oz. size, and nothing more (or, where the detector does not register that information), the problem arises of counting the number of cans of Grandma's Chicken Soup, 16 oz. size, in the grocery cart. This problem can be solved in several ways.

(1) The flickers from each item can be made to repeat at a predetermined regular time interval (flicker repetition interval) which might be on the order of a second, and that interval is made available or "known" to the detector. Therefore the detector "expects" flickers from each item at that frequency and can count the number of items by counting the number of flickers registered during the interval. For example, if each of the cans flickers at a ten second interval, and the detector has detected during any given ten-second interval five flickers denoting Grandma's Chicken Soup, 16 oz. size, then the detector registers the presence of five cans of Grandma's Chicken Soup, 16 oz. size, and adds these to the tally of items.

(2) If the detector does not "know" the flickering interval for the items, the detector can count the items of one type (e.g., number of cans of Grandma's Chicken Soup, 16 oz. size) by finding a repeating pattern, over an interval of time longer than the flickering interval of any item possibly being counted. If the flickers from each item are regular in interval, then the pattern of flickers due to a number of the items will repeat, and the detector can be programmed to look for a repeating pattern. Once a repeating pattern is identified, where each flicker corresponds to the single type of item, the number of that item can be found by counting the number of flickers in one recurrence of the pattern. This will work whenever items of one type to be counted all have the same regular interval of repetition, regardless of whether items of different types have different regular intervals of flashing, or whether they are random.

If the regular interval is "known" and supposedly the same for all of the items being counted, then determining if the pattern repeats is a check on the count, since if one of the items is repeating flickers at a different rate, then the pattern will change with time.

(3) Even if the flickers from one type of item do not recur at the same interval, the detector can still count by looking for flickers at steady intervals (which will come from each individual item), and then counting the number of those flickers.

As compared to the typical RFID discussed above, the invention has the great advantage of counting the number of items of one type in a grocery cart, or in some similar situation.

This invention can also be applied to inventory, which also counts items in place. The LED's might be mounted on the tops of the containers being inventoried, so that their flashes will reflect somewhat uniformly from the underside of the next-higher shelf (or from some other reflector) and each item's flicker will better register (and also so that their photovoltaic cells will get light to power the flickers, if photovoltaic cells are used). Flicking lamps can be mounted on various parts or sides of a single item, container, pallet, etc., and all the lamps can be driven by the same drive circuit (or synchronized respective drive circuits).

Each lamp is preferably part of a tag that includes the lamp (preferably an LED), a flicker generator (preferably an integrated circuit), a power source (battery, photovoltaic cell ("solar cell"), capacitor, etc.), and an attachment.

The attachment might be a clip, if the tag is loose, glue if the tag is to be attached, or, any other thing that will attach the lamp or incorporate the lamp in the item, removably or non-removably, depending on the application. The flicker pattern encodes the identity of the item either individually, or by a group or groups that it belongs to, or both. For example, two cans of Grandma's Soup would preferably share the identical flicker pattern, but volumes of an encyclopedia in a library preferably might have flickers that are distinguishable. The tags may be attached to each item in a group, or, alternatively, associated with a supply of items by being attached to or located adjacent to a group, a container, a pallet, a dispenser, or any other collection of the items.

The invention can also comprise a detector that senses and decodes the flickers and registers and/or counts the items.

The invention is not limited to the preferred optical flickers, but also covers radio tags.

BRIEF DESCRIPTION OF THE DRAWING FIGURES

FIG. 1A is a perspective view showing a tag.
FIG. 1B is a cross sectional view of the tag of FIG. 1A after encapsulation.
FIG. 2 is a schematic view showing one of several tagged items and a detector.

DETAILED DESCRIPTION OF THE PREFERRED EMBODIMENT

FIGS. 1A and 1B show a preferred embodiment of a tag 10. FIG. 1A shows an IC chip 100 and a photovoltaic device 102 mounted on a substrate 104, and FIG. 1B shows the structure of FIG. 1A encapsulated in a preferably transparent housing 190 after programming of the memory 126 of the IC 100, as will be described below. The programming is carried out via contacts 144 on the substrate 104.

An adhesive layer 192 is the preferred attachment for attaching the tag 10 to an item 101 to be counted, but any other kind of attachment can be used instead.

An LED 110 (or plural LED's), which is the preferred flickering lamp, is shown on the surface of the IC chip 100 in FIG. 1A to indicate that the LED can be formed with the other circuits of the chip 100 if desired, but a separately-mounted LED (not shown) can also be used. The chip 100 can include a capacitor or other electrical-energy storage device, and/or a separate battery 130 (preferably rechargeable), provided with power by the photovoltaic device 102. The photovoltaic device 102, shown as a separate part, can be incorporated into the chip 100 if desired. The photovoltaic device 102, plus storage device, constitute the preferred electrical power source for powering the driver which causes the LED 110 to flicker.

FIG. 2 shows schematically how the LED 110 is caused to flicker. The flickering light is in a pattern that encodes an identifier of the item 101. The lamp 110, preferably a visible, ultraviolet, or infrared LED, is driven by a free-running clock 122 through a counter 124 and a memory 126. The clock 122 preferably runs freely whenever it is powered. As the clock 122 runs, it increments the counter 124, and the counter outputs binary integers that increment unit by unit (e.g., 0000, 0001, 0010, 0011, . . . ) while the clock 122 is running. This output from the counter is used as an input to the memory 126, so that the contents of locations in the memory 126 are successively read out to control the output of the lamp 110. That is, each of the integers output from the counter functions as a memory selector. If the addressed memory location stores "1" the lamp 110 is lit, and if stores "0" the lamp 110 is dark (or, the other way around if desired). Inverters, amplifiers, transistors, and the like can be added to the circuit as needed, or the entire circuit as illustrated can be replaced with some other equivalent circuit that does the same job of making the lamp 110 flicker out a predetermined pattern.

The item identifier is preferably stored in the memory 126 in a PROM (Programmable Read-Only Memory); this type of memory is blank until it is permanently set by "burning" on a commercially-available machine, and this can be done via the contacts 144 shown in FIG. 1. By using a PROM or equivalent, the identifier can be quickly and permanently set into any one of a number of identical and therefore inexpensive memory devices.

Alternatively, if many similar items 101 are to be tagged, then it may be preferable to use a non-programmable memory.

The clock 122, counter 124, memory 126, and/or the LED lamp 110 can all be manufactured on one chip for lower cost and greater reliability.

Flickering light from the LED 110, indicated in FIG. 2 by a jagged arrow, goes from the unit 100 in the item to the detector 200. The light may pass through an optical system 212 to illuminate a light-sensitive transducer 210, such as a photodiode or phototransistor, which generates a voltage or electric current signal corresponding to the light impinging on it; or, the photodetector may be bare. The optical system 212 may include, as desired, a reflector or lens 214 to concentrate the flickering light and a filter 216 to eliminate light of other wavelengths. For example, if the lamp 110 is a common red LED that outputs light of wavelength 660 nanometers, then a narrow-pass 660-nanometer optical filter will improve the signal-to-noise ratio by excluding most other light. The LED 110 can also beam light out through its own optical system (not shown).

In the best mode of the invention the LED 110 flickers out the identifying flicker at regular intervals of time, which is denoted as the "flicker repetition interval" or "period." This interval, which might be on the order of a relatively large fraction of a second, a few seconds, or even a minute or more, is much longer than the "flickering rate," which is the rate at which the LED turns on and off to modulate its light and send information: the flickering rate is preferably near to a megahertz, with the light turning on and off in about a millionth of a second. The time taken for a complete flicker, which is the "flicker duration," might be about one thousandth of a second, depending on the amount of information transmitted and the flickering rate. Thus, the flicker duration is less than the flicker repetition rate, and preferably is much less.

The electric voltage signal output from the photo diode 210, that follows the intensity of the flickering light, is analyzed and decoded by a decoder 220. Commercially-available bar-code readers, and TV's that have remotes, do the same job, and show that those of skill in the an are familiar with such decoders.

The decoder 220 is coupled to a processor 240 that registers the decoded flickers from the items 101 and counts the number of flickers associated with the items 101 during a predetermined period of time, which is preferably the same period of time—namely, the flicker repetition interval—at which the LED 110 flickers.

Since the flicker duration is less than the flicker repetition rate, the flickers of items 101 will be distinct, distinguishable, and can be counted; and because the flicker repetition rate is common to all the items 101 and also the processor, the number of counted flickers will be equal to the number of flickering items. Thus, the items are counted.

The number of items that can be counted is related to the ratio of the flicker repetition rate to the flicker duration. If that ratio is high (for example, if the flicker repetition rate is five seconds and the flicker duration is five thousandths of a second, for a ratio of 1000), then dozens of items can be counted in five seconds with fair reliability. If the decoder 220 can detect overlapping flickers and count them as two flickers, then hundreds of items will be countable with good reliability, because the odds of three items flickering at once is far less than the probability of two items flickering at once. One example of a more sophisticated method for dealing with overlapping flickers is discussed below.

Coupled to the processor/counter 240 are an input 250 (e.g., a keypad) and an output 260 (e.g., a display showing the type of item and the count). The input and output may also include computers and memory storage devices, a swiped magnetic card reader, another magnetic medium, an optical link, an optical medium, and so on, packaging equipment (for packaging a predetermined number of items), deploying equipment (e.g., sending a certain number of items in one direction on a conveyor and removing the next for testing), equipment for further treatment of counted items, printers, or any other type of equipment that relies on or is related to counting items, containers, pallets, databases, etc.

A clock 222 is coupled preferably to both the decoder 220 and the processor 240 (the processor may have its own internal clock), for the flickering rate and the flicker repetition rate.

Other architectures than that shown in FIG. 2 can be used, as long as the identifier flickered from the item 101 can be registered.

The flickering lamp light will be easy to decode because a flickering LED produces a very clean signal. An ordinary 660-nm LED has a turn-on or turn-off time of about 200 ns, that is, $2 \times 10^{-7}$ s, fifth of a millionth of a second, and that means that the pulses from the LED have hard vertical edges and will appear on an oscilloscope as a "square wave" type of signal.

The flickering rate or binary bit rate can be quite rapid. As noted, an ordinary red LED has an on-off time of about 200 ns, that is, $2 \times 10^{-7}$ s or a fifth of a millionth of a second. Because of this rapid switching between light-emitting and non-light-emitting states, short binary-bit pulse intervals of, for instance, $0.5 \times 10^{-5}$ s (a two-hundred-thousandth of a second) are practical for transmission by LED. The latter interval is 250 times as long as the first.

Assuming that, to encode the identity of the item, ASCII code is used (for example), each letter or character is represented by seven bits (for example, "B" is 1000010), so an entire transmission comprising 140 bits will take less than one thousandth of a second with the bit length of a two-hundred thousandth of a second from the example above. The bit rate can be adjusted as needed in view of various factors of the electronic hardware and the environment.

The flicker repetition rate (the rate or frequency at which an entire identifier transmission is repeated), in the example above, can be as rapid as 1000 repetitions per second (1 kHz, which is the inverse of the transmission duration: 1/1000 s=1 kHz). But such a high repetition rate is not needed, and a rate substantially lower that the flicker duration is preferred.

Any repetition rate over about twenty per second will appear to the eye as a steady light (due to the persistence of vision) and will not distract a person's attention. For this reason, the repetition rate is preferably lower than the persistence time of the human eye (about a twentieth of a second), so that personnel will be able see the tag 10 blinking and make the items easier to see. The longer the flicker repetition rate, the more items can reliably be counted. The flicker repetition rate should be low enough that the probability of overlapping flickers from different items is low. Conversely, the repetition rate should also be high enough that the user will not have to wait long for the items to register and be counted.

Because it may be desirable to halt the flickering for relatively long intervals, a preferred drive circuit for the lamp 110 might include some kind of delay circuit, so that long periods of non-flickering would not need to be recorded in memory as a monotonous series of 1's or 0's, avoiding a large memory 126 with most memory areas devoted to the time interval between flickers.

Despite the provision of a relatively long quiescent period between flickers, there might be overlaps of flickers from two items both impinging on the photo detector 210 at the same time. Referring to FIG. 2 again, the rate of the clock 222 is preferably set equal to (or to a multiple or even fraction of) the rate of the clock 122 of the flickering lamp 110. When a flicker signal arrives at the decoder 220 from the photo detector 210, the decoder can then determine the phase difference between the incoming signal and the clock 222 pulses, and use that to discriminate one flicker signal from another. For example, the raw signal can be converted from a "square wave" to spikes triggered by the leading edges of the raw signal, and time-filtered according to its phase. In this way, a signal with any other phase is filtered out. Persons of skill will understand that two or more signals can be read simultaneously with this method by using two filters and two analyzing circuits. The clock 222, when synchronized with the clock 122 or a multiple of it, can also be used to help decode a single flicker.

Because of the signal strength of any one signal is constant, as mentioned above, two overlapping signals can also be separated according to their signal strengths (amplitudes).

This invention also covers an alternative embodiment of the detector (not shown) in which video imaging technology (such as a CCD imaging device) is used. If a collection of items is imaged, spatial isolation as well as temporal isolation of the flickers from the different items is possible. A flickering pixel or pixel group can be detected and filtered from the rest of the image and analyzed. Any simultaneous flickering from another area of the image could be stored for later analysis by a single decoder, avoiding the need for two decoders. A CCD can also be used as a non-imaging photodetector.

The invention is not limited to the particular embodiments specifically recited but rather encompasses all within the scope of the following claims. The present disclosure is not to be construed as limiting the scope of the invention or of the following claims. The objects of the invention are apparent from the description above.

Any identifying number, character, etc., can be used in this invention. The identifier can be numeric, alphanumeric, alphabetical, or symbolic, or a pure binary number or pattern.

The flickering lamp of this invention can, as an alternative, radiate light in more than one intensity so that the encoding of the item identifier is other than binary. For example, three states would be provided by two light levels of higher and lower intensity and a lamp-off state. However, binary encoding with only one lamp-on state is preferred.

Encoding based on the timing of pulses is also possible. One example would be uniform short light blips, each indistinguishable from the others, but conveying information through their timing (somewhat like FM radio or phase modulation).

In an environment where visible flickers would be distracting, infrared or ultraviolet flickering lamps can be used.

The invention also includes the use of analog encoding and any other encoding that will work in this invention.

Although not preferred, the invention includes tags emitting radio-frequency signals as opposed to optical signals. (There is no clear boundary between the "radio" and "optical" frequencies of electromagnetic waves, and the distinction between radio and optical frequencies is historical, based on the earlier inability to generate and detect electromagnetic waves of intermediate frequencies, such as microwaves, which is possible today.) Radio tags have the advantage that detection is less dependent on a line of sight between the tag and the detector, and the disadvantage that information is sent more slowly and with less directionality. Such radio tags would, like the optical tags described above, emit signals at regular intervals.

The invention contemplates radio tags that have a single period of emitting radio flickers (like the optical flickers discussed above but comprised of radio waves instead of light) at a flicker repetition interval, but are not strongly synchronized to the start of power-supplying radio waves. If the radio tags do not all flicker (send out an identifying information burst) at the same time when exposed to energy-supplying radio waves, then the items to which they are attached can be counted because the detector will not be overwhelmed. There are various ways to accomplish this.

One way is to use an internal battery or photovoltaic cell to power a clock in the radio tag, with radio bursts (flickers) permitted only at the end of a clocked period. Such a radio tag would be similar to the LED-light-emitting tag described above, but would have a transmitter and antenna in place of the LED, and would send "CW" (continuous wave) radio signals, by turning the carrier frequency on and off like Morse code. More sophisticated modulations, such as variable AM, FM, and phase modulation, might also be used.

Another way is for the tags to have a fixed flicker repetition interval once they are powered up, but an at-least-somewhat random time of first response to the powering radio waves, either by the usual manufacturing and environmental variations (if these are sufficient), or by building into the tags some structure to provide a random first flicker; for example, the capacitors that are charged to power the tag's radio emissions might have different random numbers of microfarads, or, each tag could have a random start-delay circuit. Once the tag first flickered, the succeeding flickers would be timed by the internal clock, also powered by the incoming radio waves.

The preferred optical tags can also use this method, which would be useful for tagged items kept in the dark for long periods (so that batteries and photovoltaic cells would run down), or to reduce the cost of photovoltaic cells or batteries.

This invention includes tags that absorb electromagnetic energy at one frequency and flicker out information at another frequency. For example, flickering-LED optical-signal tags can be powered by radio waves, as conventional RFID tags are; and radio-burst flickering tags can be powered by photovoltaic cells.

Above, and in the following claims:

"flicker repetition interval" means the time between the start of one flickered identifier and the start of a succeeding flickered identifier;

"group/identity" means the group or groups to which an item belongs, and/or an individual identity of the item;

"lamp" is any device producing light;

"light" means visible light, far and/or near infrared and ultraviolet light, and "radio" means all lower frequencies of electromagnetic radiation; and "radiator" is a device emitting electromagnetic waves.

I claim:

1. A method of counting items in a collection of items, the method comprising steps of:
   attaching to each item to be counted a respective electromagnet radiator, each radiator continually emitting an encoded flicker, the flicker from each radiator being emitted at a regular interval of time, the interval being common to the items be counted and comprising a flicker repetition interval, the flicker repetition interval being longer than a flicker duration;
   providing a detector;
   registering all of the items with the detector as the items flicker during a time interval equal to the flicker repetition interval; and
   counting the items by a number of their flickers registered during the time interval equal to the flicker repetition interval.

2. The method according to claim 1, comprising attaching to each item a driver driving the radiator to emit the flicker and a power source powering the driver, and wherein the radiator, the driver, and the power source are comprised in a tag that is attachable to the item.

3. The method according to claim 2, comprising providing a memory, coupled to the driver, to store a temporal pattern of the flicker.

4. The method according to claim 3, comprising programming the memory.

5. The method according to claim 1, wherein the step of registering all of the items comprises detecting overlapping flickers and counting the overlapping flickers as two flickers.

6. The method according to claim 1, wherein the items have an individual identity within the collection and/or belong to a group within the collection, and wherein the flickers comprise fields and each of the fields comprises a subset, a superset, or an individual identity of the group/identity of the item.

7. The method according to claim 1, comprising providing a clock to maintain a regular flicker repetition interval of the flickers.

8. The method according to claim 1, wherein the regular interval of time implies a definite and fixed repetition rate.

9. A system for counting items by flickering, comprising:
   (a) for each item to be counted, a respective tag further comprising:
   a radiator;
   a driver driving the radiator to emit an electromagnetic flicker, at a regular interval of time comprising a flicker repetition interval common to each of the items, the flicker repetition interval being longer than a flicker duration;
   a power source powering the driver; and
   an attachment of the tag to the item; and
   (b) a detector registering the flickers, wherein the items are countable by counting the flickers during a time interval equal to the flicker repetition interval;
   whereby the items are countable by a number of flickers registered during the flicker repetition interval.

10. The system according to claim 9, comprising a driver, attached to each item, driving the radiator to emit the flicker and a power source powering the driver, and wherein the radiator, the driver, and the power source are comprised in a tag attachable to the item.

11. The system according to claim 10, comprising a memory, coupled to the driver, to store a temporal pattern of the flicker.

12. The system according to claim 11, comprising means for programming the memory.

13. The system according to claim 9, means for detecting overlapping flickers and counting the overlapping flickers as two flickers.

14. The system according to claim 9, wherein the items have an individual identity within the collection and/or belong to a group within the collection, and wherein the flickers comprise fields and each of the fields comprises a subset, a superset, or an individual identity of the group/identity of the item.

15. The system according to claim 9, comprising a clock to maintain a regular flicker repetition interval of the flickers.

16. The system according to claim 9, wherein the regular interval of time implies a definite and fixed repetition rate.

17. A method of counting items, comprising:
   attaching to items in a collection of the items respective tags emitting electromagnetic radiation in a flickering pattern wherein the flickering pattern identifies the items to which the tags are attached;
   determining a regular flicker repetition interval of each of the tags;
   providing a detector and using the detector to register the flickers from each of the tagged items, during a time interval that is equal to or longer than the respective flicker repetition interval; and
   counting the flickers registered during a time interval equal to the respective flicker repetition interval.

18. The method according to claim 17, wherein a first subset of the collection of tagged items share a first flickering pattern, and a second subset of the collection of tagged items share a second flickering pattern.

19. The method according to claim 18, wherein the tags of the first subset have a first flicker repetition interval, and the tags of the second subset have a second flicker repetition interval different from the first flicker repetition interval.

20. The method according to claim 17, wherein the step of determining a flicker repetition interval of the tags comprises finding a repeated pattern of the flickers from at least one of the tagged items.

* * * * *